(12) United States Patent
Foti

(10) Patent No.: US 8,943,132 B2
(45) Date of Patent: Jan. 27, 2015

(54) SYSTEMS AND METHODS FOR OPTIMIZATION OF SUBSCRIPTIONS TO RESOURCE CHANGES IN MACHINE-TO-MACHINE (M2M) SYSTEMS

(75) Inventor: George Foti, Dollard des Ormeaux (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 207 days.

(21) Appl. No.: 13/230,748

(22) Filed: Sep. 12, 2011

(65) Prior Publication Data
US 2013/0066965 A1    Mar. 14, 2013

(51) Int. Cl.
*G06F 15/16*    (2006.01)
*H04W 4/00*    (2009.01)
*H04L 29/08*    (2006.01)

(52) U.S. Cl.
CPC .............. *H04W 4/005* (2013.01); *H04L 67/24* (2013.01); *H04L 67/2833* (2013.01)
USPC ........................................................ 709/204

(58) Field of Classification Search
USPC .................................... 709/203, 204, 200, 217
See application file for complete search history.

(56) References Cited

U.S. PATENT DOCUMENTS

2009/0150789 A1*  6/2009  Regnier .................. 715/736
2012/0047558 A1*  2/2012  Sundaram et al. ............ 726/3

OTHER PUBLICATIONS

J. Rosenberg et al., Optimizing Federated Presence with View Sharing, Internet Draft, Nov. 3, 2008, pp. 1-32.
PCT Search Report from corresponding application PCT/IB2012/054752.

* cited by examiner

*Primary Examiner* — El Hadji Sall
(74) *Attorney, Agent, or Firm* — Francois Cartier; Ericsson Canada Inc.

(57) ABSTRACT

Systems and methods provide for bundling subscriptions associated with a Machine-to-Machine (M2M) device or M2M application into a single hypertext transport protocol (HTTP) session. A method includes subscribing, by a gateway (GW), to an M2M device on behalf of a plurality of subscribers using a single Hypertext Transport Protocol (HTTP) session.

9 Claims, 13 Drawing Sheets

SYSTEMS AND METHODS FOR OPTIMIZATION OF SUBSCRIPTIONS TO RESOURCE CHANGES IN MACHINE-TO-MACHINE (M2M) SYSTEMS

TECHNICAL FIELD

The embodiments of the subject matter disclosed herein generally relate to communication systems and more particularly relate to subscription control in Machine-to-Machine (M2M) systems.

BACKGROUND

During the past years, the interest in using mobile and landline/wireline computing devices in day-to-day communications has increased. Desktop computers, workstations, and other wireline computers currently allow users to communicate, for example, via e-mail, video conferencing, and instant messaging (IM). Mobile devices, for example, mobile telephones, handheld computers, personal digital assistants (PDAs), etc., also allow users to communicate via e-mail, video conferencing, IM, and the like. Mobile telephones have conventionally served as voice communication devices, but through technological advancements they have recently proved to be effective devices for communicating data, graphics, etc. Wireless and landline technologies continue to merge into a more unified communication system, as user demand for seamless communications across different platforms increases, which in turn creates more usage, and leads to more services and system improvements.

Another area which has benefited from the technologies associated with the advances in communications technology is Machine-to-Machine (M2M) systems. Early M2M systems typically were private systems which allowed for communication between a sensor and a device, wherein information associated with the sensor, e.g., current fluctuation, water flow, temperature, etc., could be transmitted back to a device which could use that information or allow an operator to use the information.

More recent M2M systems are more public systems which can allow a plurality of sensor, devices, software applications and user terminals to share information. M2M systems can also allow any application to subscribe to any change to any M2M resource held in an M2M Service Capability Platform. For example, an M2M system could be designed wherein a sensor is placed at every utility meter enabling hundreds or thousands of M2M applications to subscribe to fluctuations in energy usage by thousands or millions of energy consumers, or to be notified when battery levels in these remote devices fall below certain range. With these options, as M2M systems grow, the volume of transmitted information in M2M systems is expected to become quite large.

Accordingly, systems and methods for efficient communications in M2M systems are desirable.

SUMMARY

It is an object of the present invention to obviate or mitigate at least one disadvantage of the prior art.

In a first embodiment of the present invention, there is provided a method for handling subscriptions in a machine-to-machine system. The method comprises the steps of receiving a subscription request, determining that the received request is a duplicate, determining a plurality of nodes associated with a received notification and transmitting a notification message. In the step of receiving the subscription request, the request is received at a gateway and is associated with both a machine to machine device and a machine to machine network server. In the step of determining, the received subscription request is determined to be a duplicate of an existing subscription request. The step of determining is performed responsive to the receipt of a notification associated with the received request, and in the step, the gateway determines a plurality of nodes associated with the received notification, one of the nodes in the plurality being the node from which the request was originated. In the step of transmitting, the gateway sends to each node in the determined plurality a notification message associated with the received notification.

In an embodiment of the first aspect of the present invention, the subscription request received at the gateway is transmitted by the machine to machine device and specifies the machine to machine network server as a destination, and optionally the step of determining a plurality of nodes includes determining a plurality of machine to machine devices, including the machine to machine device associated with the received subscription. In another embodiment, the subscription request received at the gateway is transmitted by the machine to machine network server and specifies the machine to machine device as a destination, and optionally the step of determining a plurality of nodes includes determining a plurality of machine to machine network servers including the machine to machine network server associated with the received subscription. In a further embodiment, the step of determining includes comparing the received subscription request with at least one previously received subscription, and optionally the step of comparing the received subscription request includes comparing the received subscription request with a set of subscribed events stored in a traffic table. In a further embodiment, the method includes the step of responding to the originator of the request subsequent to the step of determining. In another embodiment, the method further includes the step of updating a traffic table to reflect the received subscription. In yet another embodiment, the received request is a hypertext transfer protocol request.

In a second aspect of the present invention, there is provided a method for handling subscriptions in a machine-to-machine system. The method comprises the steps of receiving a subscription request, determining that the received request is directed to a particular resource, closing a session and transmitting a new subscription. In the step of receiving, a gateway receives a subscription request associated with a machine to machine device and a machine to machine network server. Upon receiving the request, the gateway determines that the received subscription request is directed to a resource with which a previous subscription has been registered. The gateway then closes a session associated with the previous subscription with the resource, and finally transmits to the resource a new subscription determined in accordance with the previous subscription and the received subscription request.

In an embodiment of the second aspect of the present invention, the session is a hypertext transfer protocol (http) session, and optionally the step of transmitting includes creating a new http session. In a further embodiment, the session is associated with a plurality of previous subscriptions, and the step of transmitting includes transmitting a new subscription determined in accordance with all subscriptions associated with the closed session and the received subscription request.

In a third aspect of the present invention, there is provided a gateway for communicating data in a machine-to-machine network. The gateway comprises a communications interface, a memory and a processor. The communications interface is used to receive from M2M devices both subscription requests and notifications, and to transmit to M2M devices both subscription requests and notifications. The memory stores a traffic table. The processor determines if a subscription request received over the communications interface is a duplicate of an existing request, updates the traffic table stored in the memory in accordance with the received request, determines in accordance with the traffic table a plurality of nodes associated with a notification received over the communications interface, and transmits notifications to the determined plurality of nodes in response to receipt of the notification.

In an embodiment of the third aspect, the processor is adapted to generate a subscription request for transmission over the communications interface in response to receipt of a subscription request over the communications interface, the generated subscription request identifying only the gateway as the subscribing node. In a further embodiment, the processor is adapted to determine that a subscription request received over the communications interface is directed to a resource for which there is an existing subscription to a different event, and responsive to such a determination, to close a session associate with the previous subscription, and to transmit over the communications interface a new subscription to the resource determined in accordance with the received subscription request and any subscription associated with the closed session.

In another aspect of the present invention, there is provided a method for communicating data in a Machine-to-Machine (M2M) system. The method comprises subscribing, by a gateway (GW), to an M2M device on behalf of a plurality of subscribers using a single Hypertext Transport Protocol (HTTP) session. In embodiments of this aspect, the method can further include the steps of examining a received subscription at the GW; determining if there is an entry in a traffic table of the GW associated with the subscription; if there is an entry in the traffic table of the GW for the subscription, updating the traffic table of the GW with the information from the subscription; and if there is no entry in the traffic table of the GW for the subscription, the following steps are performed: determining if the subscription is for a resource for which the GW has an established subscription; if the subscription is for a resource for which the GW has an established subscription, establishing a new entry for the new M2M device or M2M application in the traffic table of the GW; and if the subscription is for a resource for which the GW does not have an established subscription, establishing an HTTP session which includes the subscription. In a further embodiment, the method includes the step of terminating an older HTTP session, and may optionally include bundling a plurality of subscription requests into the HTTP session. In a further embodiment, the method further comprises examining a received subscription as part of an HTTP session at an M2M Service Capabilities Platform (SCP); determining if there is an entry in a traffic table of the M2M SCP associated with the subscription; if there is an entry in the traffic table of the M2M SCP for the subscription, updating the traffic table of the M2M SCP with the information from the subscription; and if there is no entry in the traffic table of the M2M SCP for the subscription, the following steps are performed: determining if the subscription is for a resource for which the M2M SCP has an established subscription; if the subscription is for a resource for which the M2M SCP has an established subscription, establishing a new entry for the new M2M device or M2M application in the traffic table of the M2M SCP; and if the subscription is for a resource for which the M2M SCP does not have an established subscription, establishing a session initiation protocol (SIP) session which includes the subscription. Optionally, the method includes bundling a plurality of subscription requests into the SIP session and in some embodiments further includes receiving a SIP message at the M2M SCP which includes information regarding a change in a resource; and transmitting an HTTP message from the M2M SCP which includes information regarding the change in a resource to the GW. In another embodiment, the SIP message is transmitted from an extensible markup language database management server (XDMS). In another embodiment the traffic table of the GW and the traffic table of the M2M SCP include an application field, a device field, a resource field, an incoming session field and an outgoing session field. In a further embodiment the method further includes translating resource information, by the M2M SCP, into a SIP uniform resource locator (URL). In another embodiment, the XDMS is configured to communicate with the M2M SCP over an XDM-2 interface.

In another aspect of the present invention, there is provided a gateway (GW) for communicating data in a Machine-to-Machine (M2M) system. The gateway comprises a communications interface configured to subscribe to an M2M device on behalf of a plurality of subscribers using a single Hypertext Transport Protocol (HTTP) session. The gateway, in other embodiments, can further include a processor configured to examine a received subscription at the GW; the processor configured to determine if there is an entry in a traffic table of the GW associated with the subscription; if there is an entry in the traffic table of the GW for the subscription, updating the traffic table of the GW with the information from the subscription; and if there is no entry in the traffic table of the GW for the subscription, the following steps are performed: determining if the subscription is for a resource for which the GW has an established subscription; if the subscription is for a resource for which the GW has an established subscription, establishing a new entry for a new M2M device or M2M application in the traffic table of the GW; and if the subscription is for a resource for which the GW does not have an established subscription, establishing an HTTP session which includes the subscription. In another embodiment, an older HTTP session is terminated, and optionally, a plurality of subscription requests are bundled into the HTTP session.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

Figure 1:
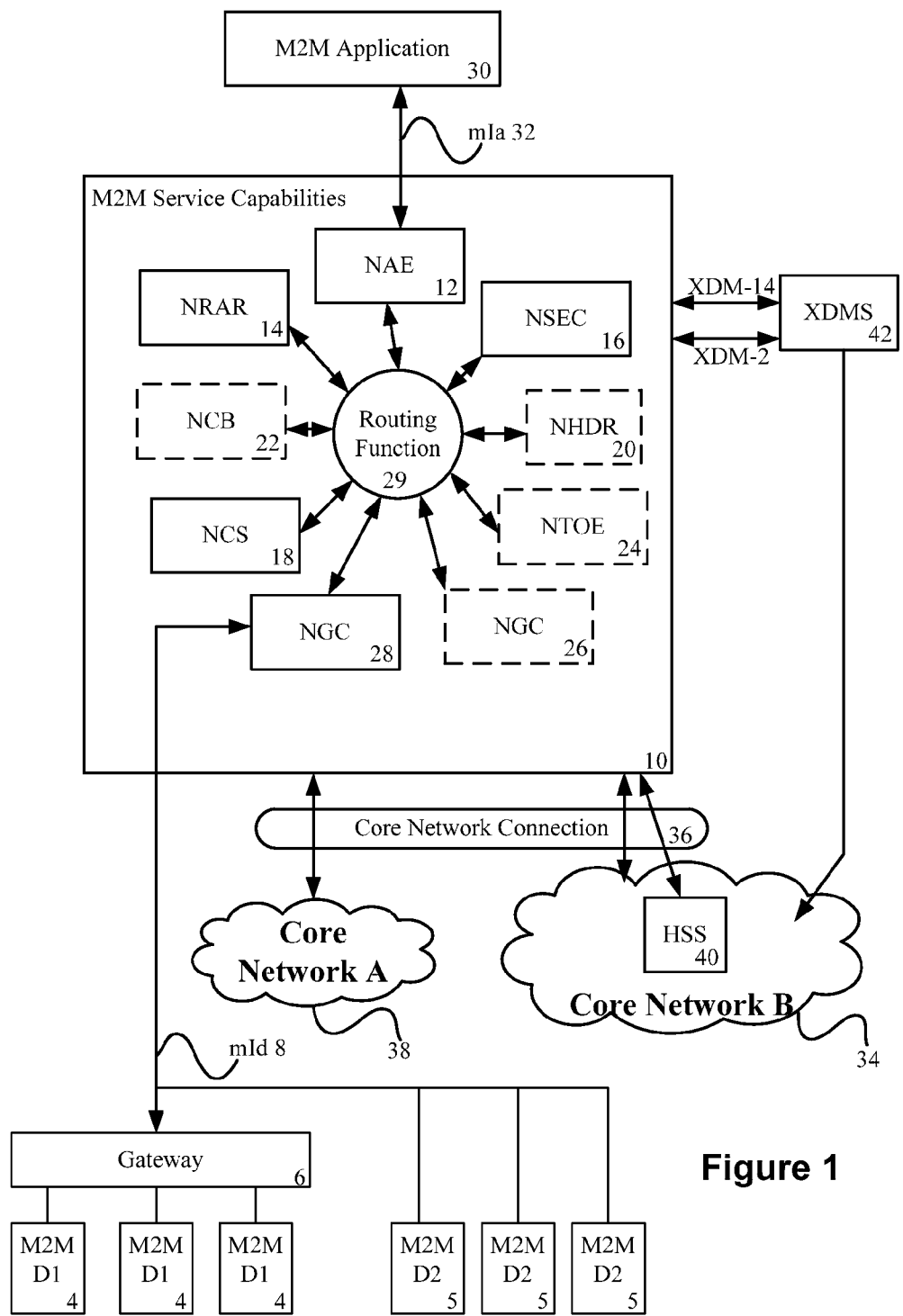
FIG. 1 depicts a Machine-to-Machine (M2M) architecture according to exemplary embodiments.

According to exemplary embodiments, subscriptions to resources can be managed in an M2M system to reduce congestion and improve communications efficiency. An exemplary M2M architecture 2 in which the various exemplary embodiments described herein can be implemented is now described with respect to FIG. 1. M2M architecture 2 includes a plurality of M2M devices (M2M D1) 4 which communicate with a gateway (GW) 6 and a plurality of devices of M2M devices (M2M D2) 5 which communicate directly with the M2M Capability Platform 10. The GW 6 can communicate with an M2M Service Capability Platform 10 over an mId reference point 8. Examples of the various internal functions within the M2M service capabilities platform 10 can include a Network Application Enablement (NAE) capability 12, a Network Reachability, Addressing and Repository (NRAR) capability 14, a Network Security (NSEC) capability 16, a Network Communication Selection (NCS) capability 18, a Network History and Data Retention (NHDR) capability 20, a Network Compensation Brokerage (NCB) capability 22, a Network Telco Operator Exposure (NTOE) capability 24, a Network Transaction Management (NTM) capability 26, a Network Generic Communication (NGC) capability 28 and a routing function 29. As shown in FIG. 1, some of these service capabilities are shown in a solid line box generally indicating required capabilities and some of the service capabilities are shown in a dashed line box generally indicating optional service capabilities. More or fewer service capabilities could be used.

The NAE capability 12 can act as the contact point to M2M Applications 30 in the network and applications domain over the mIa reference point 32. The NAE capability 12 can also perform authorization and authentication of M2M applications. The NRAR 14 can provide mapping between one or more M2M devices 5, one or more M2M devices 4 the GW 6 and a set of information which can include M2M device 5's reachability and a routing address for the M2M device 5 and/or M2M devices 4 via GW 6. The NSEC capability 16 can provide authentication and service key management functions for applications resident in the M2M devices 5 or the GW 6 or M2M devices 4 after successful authentication and registration. The NCS capability 18 can provide both a network selection function and a communication service selection function for M2M devices 5, M2M devices 4 and the GW 6 when applicable and desired. The NHDR capability 20 can be used to archive information as desired. The NCB capability 22 can be used to provide settlement between vendors and customers when compensation, e.g., money or the equivalent, is desired. The NTOE capability 24 can map an operator's non-M2M services, e.g., Telco services, into M2M resources for use by various M2M service capabilities and applications. The NTM capability 26 can perform the management of transactions for the NAE capability 12. The NGC capability 28 can provide transport session and teardown as well as providing encryption on communications with M2M devices 5 and M2M devices 4 via GWs 6. The routing function 29 provides routing and communications between service capabilities on or associated with the M2M Service Capabilities Platform 10.

The M2M Service Capabilities Platform 10 can be a platform which can include some or all of the exemplary capabilities described above. The M2M Service Capabilities Platform 10 can be considered to have an entry point and the ability to proxy an incoming request to the desired internal function. The M2M Service Capabilities Platform 10 additionally can be in communications with one or more core networks, e.g., Core Network A 38 and Core Network B 34, over a Core Network Connection 36 or other communication link(s) as desired. The M2M Service Capabilities Platform 10 also can communicate with a Home Subscriber Service (HSS) 40 which contains subscription related information and can perform authentication/authorization functions for the Core Network B 34. An eXtensible Markup Language (XML) database management server (XDMS) 42 can also communicate with the M2M Service Capabilities Platform 10 as shown in FIG. 1. An XDM-2 link allows the M2M Service Capabilities Platform 10 to directly communicate with the XDMS 42. This allows the M2M Service Capabilities Platform 10 to send SIP SUBSCRIBE's directly to the XDMS 42 without the need of going through a SIP Network at all.

Note that the XDMS 42 expects all resources to have an identity of a SIP URL. According to exemplary embodiments, there can be situations where resources for which we want to use the XDMS 42 are not really identified by a SIP URL. This means that SIP SUBSCRIBE messages from the XDMS 42 cannot go through a SIP network as would normally occur. Instead the M2M Service Capabilities Platform 10 can make the resources look like SIP URLs and act as a go between for the resource and the XDMS 42, i.e., translating resource information into a SIP URL and the reverse. When a SIP NOTIFY is returned the M2M Service Capabilities Platform 10 will restore the message back to the original identity of the resource. Additionally, the XDM-14 interface provides functionality to the M2M Service Capabilities platform to manage the resources stored in the XDMS 42, e.g., create, modify and retrieve, in accordance with relevant standards.

According to exemplary embodiments using the above described M2M architecture 2, communications traffic and congestion within the M2M architecture 2 can be streamlined or reduced by having multiple subscriptions for the same data stream or event share a single hypertext transfer protocol (HTTP) session for all applications in an M2M device 4. That is the M2M devices 4 and 5 according to an embodiment can multiplex all of the subscriptions targeted to the same node into a single HTTP request. Alternatively, a predetermined number of subscriptions, e.g., 10 subscriptions could be multiplexed into a single HTTP request. In another exemplary embodiment, multiple subscriptions within the same device associated with the same data stream or event are not replicated. State information can be maintained for those subscriptions for later notification. Each of these embodiments will now be described in more detail.

For example, the multiplexing of subscriptions into a single request can be performed by M2M devices 4, M2M devices 5, GW 6 and/or by the M2M Service Capability platform 10. For the GW 6, there can be a limited number, or one, of simultaneous HTTP sessions for all incoming subscription requests from all of the M2M devices 4. The number of HTTP sessions used by the GW 6 can be one or more, since the GW 6 can multiplex subscriptions into a single HTTP request or multiple HTTP requests as desired. The M2M Service Capability platform 10 can perform a similar multiplexing for received subscriptions from GW 6 and M2M devices 5. According to exemplary embodiments, traffic tables can be used in the M2M devices 4, M2M devices 5, the GW 6 and/or the M2M Service Capability Platform 10 for managing the multiplexing of the subscriptions, additionally a same or similar algorithm can be used by the M2M devices 4, M2M devices 5, the GWs 6 and/or the M2M Service Capability Platform 10 for performing subscription management.

In addition to multiplexing multiple subscriptions associated with the same device into a single HTTP session, another embodiment instead eliminates the replication of subscriptions for same events which are generated from applications within the same M2M device 4, M2M device 5 and/or from the gateway when receiving subscription to identical events from multiple M2M devices 4. Thus, for example, a single subscription can be sent from an M2M device 4 via GW 6 or from an M2M device 5 to the M2M Service Capabilities Platform 10, when multiple applications within the same M2M device 4 or M2M device 5 are subscribed to the same event. By the same token, a single subscription is generated from the GW 6 when multiple M2M devices 4 connected to the same GW 6 are subscribed to the same event. By maintaining M2M State information in, for example, the GW 6, all of the associated applications can be notified when a notification associated with the single subscription is received by the GW 6.

Figure 2:
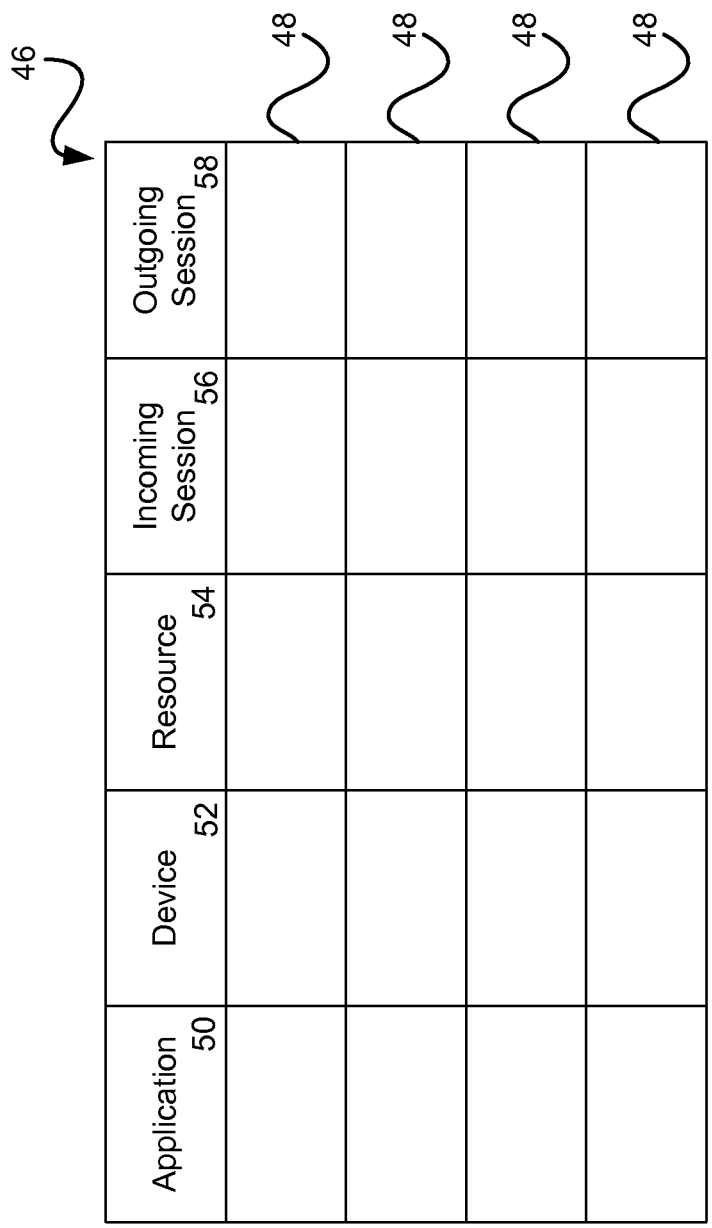
FIG. 2 illustrates a traffic table according to exemplary embodiments.

In order to implement, for example, the multiplexing of subscriptions or elimination of replication of subscriptions as described above, a traffic table can, for example be used to perform the needed associations. According to exemplary embodiments, the traffic table used by the M2M devices 4, the M2M devices 5, the GW 6 and/or the M2M Service Capability Platform 10 can be the same or similar. An example of a traffic table 46 is shown in FIG. 2. Each M2M device 4, M2M device 5, GW 6 and M2M SCP 10 can have its own traffic table 46. There can be one entry per subscription into the traffic table. Each entry (or row) 48 in the traffic table 46 can include, for example, the following fields: Application 50, Device 52, Resource 54, Incoming Session 56 and Outgoing Session 58. The Application field 50 includes the application identification of the application that is originating the subscription request, the Device field 52 includes the identity of the device originating the subscription request, the Resource field 54 includes the identity of the subscribed to resource, the Incoming Session field 56 includes the identity of the incoming session that conveyed the subscription and the Outgoing Session field 58 includes the identity of the outgoing session that conveyed the subscription to the next hop where applicable.

According to exemplary embodiments, the M2M Service Capabilities Platform 10 can include a generic database for storing various types of data, e.g., meter readings and other measurements from the M2M devices 4, M2M devices 5, GW 6 as well as one or more traffic tables 46 as desired. The M2M Service Capabilities Platform 10 can be open for access by all users or the M2M Service Capabilities Platform 10 can implement access and authorization controls for protecting access to the stored data. Operators of the M2M devices 4, M2M devices 5 and/or GW 6 can also be informed both when users read data associated with the M2M devices 4, M2M devices 5 and/or GW 6 or when users submit a request for access which may be required prior to allowing subscriptions to be submitted. For example, a user can request authorization for subscribing to events generated by a meter which measures water usage. Once authorized by the M2M device 4 owner (or the operator of the M2M communications system 2) the user can be allowed to subscribe to the meter. One skilled in the art will appreciate that gateways can be used to handle subscriptions to devices when the devices connect to the network through the gateway. When changes are submitted by the meter as events occur, notifications can be sent to the various subscribed users informing them that information may be fetched associated with the meter. Exemplary embodiments provided below, described how this subscription and resource monitoring can occur in more detail.

According to exemplary embodiments, as generally described herein the XDMS 42 is the data base which is used. This is a specific database whose usage is standardized for storing and managing XML data. This is how this information is typically available in the M2M environment. XDMS 42 also supports the SIP SUBSCRIBE procedures. Although call flows shown and described herein show the usage of the XDMS 42 and SIP, it is to be understood that other databases and/or messaging protocols could be used. The data base can be external or internal to the M2M Service Capabilities Platform 10. If the database were internal to the M2M Service Capabilities Platform 10 certain messages, e.g., SIP SUBSCRIBE, would not need to be used.

As described above, exemplary embodiments for subscription optimization can be implemented on M2M devices 4, M2M devices 5, the GW 6 and/or the M2M Service Capability Platform 10. Initially, an exemplary embodiment with respect to a GW 6's handling of subscriptions on the incoming side, e.g., from an M2M device 4, is described. If the GW 6 has an existing HTTP session with an M2M device 4 for which a new incoming subscription request has arrived, the GW 6 then terminates the old HTTP session and proceeds to examine the new incoming subscription request(s) in the incoming HTTP session. If the GW 6 does not have an existing HTTP session with the M2M device 4 for which a new incoming session subscription request has arrived, the GW 6 proceeds to examine the incoming subscription(s) in the new request. According to exemplary embodiments, the GW 6 examines the incoming one or more subscriptions in the incoming HTTP session request for an M2M device 4 using two steps for each subscription request in the incoming session.

Step 1. If there are no more subscriptions to process, then the GW 6's algorithm for controlling subscriptions terminates. Assuming there are more subscriptions to process, the GW 6 then fetches the next subscription request from the incoming HTTP session and searches the GW 6's traffic table to determine if there is an existing entry for that subscription. If no entry for this subscription exists in the GW 6's traffic table, then this is considered to be a new subscription and the algorithm moves to Step 2. If a subscription exists, then the GW 6 updates the incoming HTTP session field in the GW 6's traffic table for that entry with an identifier associated with the new incoming HTTP session. Other parameters pertinent to the subscription but not stored in the traffic table can be updated by other means. The GW 6 then proceeds to examine the next subscription and can repeat step 1 as long as there are subscriptions to examine for this particular M2M device 4. This process can also be performed for a plurality of M2M devices 4.

Step 2. If the new subscription is a subscription by a resource for which the GW 6 already has an established subscription with the M2M Service Capability Platform 10, e.g., a different application on a different device for which another subscription already exists, the GW 6 establishes a new entry for the new M2M application or M2M device 4 with the appropriate information in the GW 6's traffic table without any additional action, i.e., this allows for replication avoidance. The GW 6's subscription evaluation algorithm can then go back to Step 1.

If, alternatively, the new subscription from an M2M application or an M2M device 4 is for a new resource for which the GW 6 does not have an already established subscription, Step 2 can be continued in different manners. For a first exemplary case, there can be an ongoing and outstanding HTTP session with the M2M Service Capability Platform 10. The GW 6 establishes a new HTTP session with the M2M Service Capability Platform 10 which can include all subscriptions issued under the old HTTP session in addition to the new subscription. Upon receipt of this request by the M2M Service Capability Platform 10, the M2M Service Capability Platform 10 can terminate the old HTTP session and update its traffic table by updating all of the entries for the existing, impacted subscriptions to indicate the new incoming HTTP session for these subscriptions.

According to another exemplary embodiment, for a second exemplary case where a new subscription is identified for a resource and there is no ongoing session with the M2M Service Capability Platform 10. In this second Case, the GW 6 establishes a new HTTP session with the M2M Service Capability Platform 10 to convey the new subscription request. Upon receipt of the subscription request by the M2M Service Capability Platform 10, the M2M Service Capability Platform 10 can update its traffic table accordingly to create a new entry in its traffic table. For both the first and second cases associated with Step 2, the GW 6 can update its traffic table, to include the outgoing session information, with the appropriate information following the conclusion of Step 2. After that, the algorithm returns to Step 1.

Figure 3:
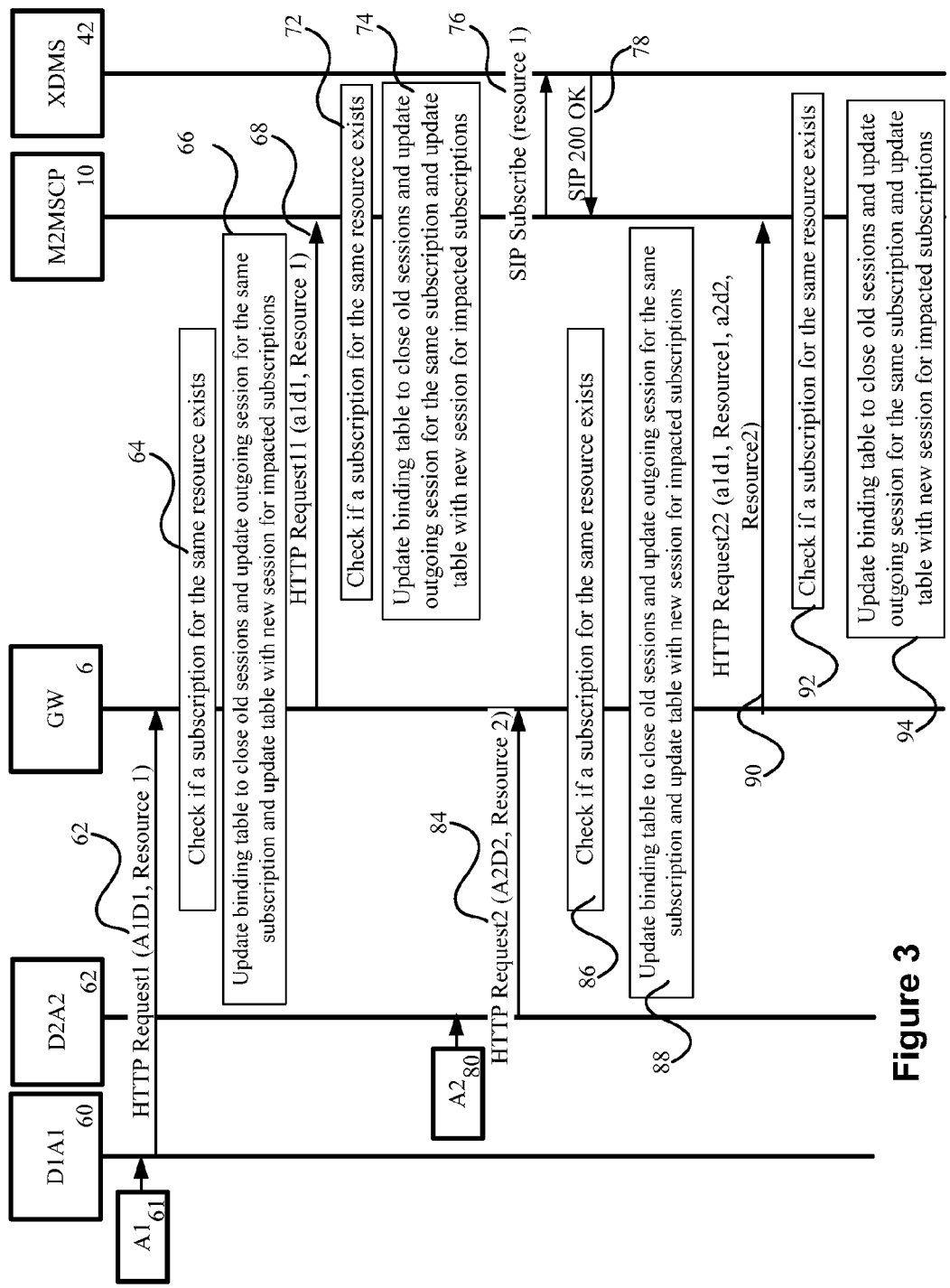
FIGS. 3 and 4 show a signaling diagram for managing multiple subscriptions for any resource from a gateway (GW) according to exemplary embodiments.
Figure 4:
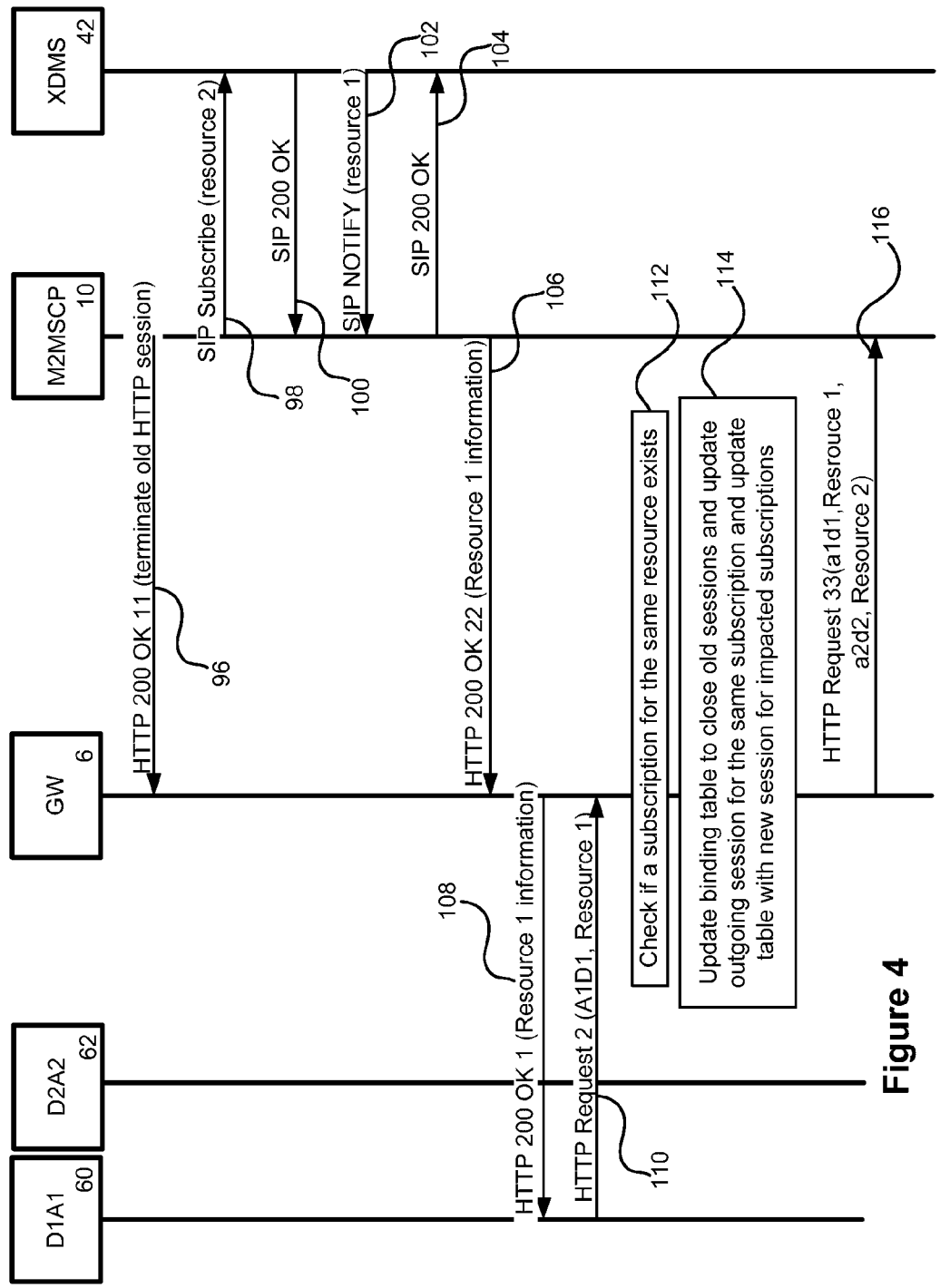

According to exemplary embodiments, the signaling diagrams of FIGS. 3 and 4, which show techniques for handling multiple subscriptions for any resource by the GW 6, are now described to further illustrate the above described algorithm. Initially, application 1 (A1) operating on M2M device 1 (shown as D1A1) 60 triggers a subscription 61 and sends an HTTP request message 62 to the GW 6 to subscribe to changes to resource R1. The GW 6 implements the algorithm described above which includes checking if a subscription for the same resource exists in box 64 and updating the binding table (traffic table) to close old sessions and update outgoing sessions for the new subscription and update the traffic table with a new incoming session for impacted (existing) subscriptions in box 66. For this example, there is no ongoing HTTP session with the M2M device 1, and the outcome of the algorithm also results in the GW 6 sending an HTTP request 68 to the M2M Service Capabilities Platform 10 to subscribe to changes to resource R1.

Upon receipt of the HTTP request 68, the M2M SCP 10 implements a similar algorithm as was implemented in the GW 6, i.e., checking if a subscription for the same resource exists in box 72 and updating the binding table (traffic table) to close old sessions and update outgoing sessions for the same subscription and update the traffic table with a new incoming session for impacted subscriptions in box 74. In this example, there is no ongoing HTTP session with the GW 6, and the algorithm also results in the M2M SCP 10 in sending a SIP SUBSCRIBE message 76 to the XDMS 42 to subscribe to changes in the resource R1. After receipt of the SIP SUBSCRIBE message 76, the XDMS 42 responds with a SIP 200 OK message 78. Upon receipt of the SIP 200 OK message 78, the M2M SCP 10 updates its traffic table with the outgoing session information.

Another M2M device with a second application D2A2 80 which triggers a subscription 80 results in D2A2 80 sending an HTTP request 84 to the GW 6 to subscribe to changes to resource R2. The GW 6 implements the algorithm described above which includes checking if a subscription for the same resource exists in box 86 and updating the binding table (traffic table) to close old sessions from the same device if applicable, and update outgoing sessions for the same subscription and update the traffic table with a new session for impacted subscriptions in box 88. For this example, the outcome of the algorithm also results in the GW 6 sending an HTTP request 90 to the M2M Service Capabilities Platform 10 to subscribe to changes to both resources R1 and R2 for their respective devices.

Upon receipt of the HTTP request 90, the M2M SCP 10 implements a similar algorithm as was implemented in the GW 6, i.e., checking if a subscription for the same resource exists in box 92 and updating the binding table (traffic table) to close old sessions and update outgoing sessions for the same subscription and update the traffic table with a new session for impacted subscriptions in box 94. In this example, the algorithm also results in the M2M SCP 10 sending a SIP SUBSCRIBE message 98 to the XDMS 42 to also subscribe to changes in the resource R2. Additionally, in this example and as a result of the M2M SCP 10's algorithm, the M2M SCP 10 sends an HTTP 200 OK message 96 to the GW 6 to terminate the old HTTP session associated with the HTTP request 68. After receipt of the SIP SUBSCRIBE message 98, the XDMS 42 responds with a SIP 200 OK message 100. Upon receipt of the SIP 200 OK message 100, the M2M SCP 10 updates its traffic table with the outgoing session information.

Continuing with this example, consider that a change in resource R1 has occurred. The XDMS 42 sends a SIP NOTIFY message 102 to the M2M SCP 10 to report the change and includes the changed information regarding resource R1. The M2M SCP 10 acknowledges the SIP NOTIFY message 102 with a SIP OK 200 message 104 which the M2M SCP 10 sends back to the XDMS 42. The M2M SCP 10 then, using its traffic table, identifies all active subscriptions for M2M applications that subscribed to the requested resource to report the change information. The M2M SCP 10 sends an HTTP 200 OK message 106 to the GW 6 with the information related to the change. The GW 6 subsequently sends an HTTP 200 OK message 108 to D1A1 60 with the information related to the change of resource R1. At this point in time, the GW 6 needs to refresh subscriptions. The GW 6 can wait to see if D1 wishes to renew its subscription as well. After the delay period ends, the GW 6 can renew all of its remaining subscriptions. If D1 has sent an HTTP Request to the GW 6 to renew its subscription then the request from D1 can be included as well.

In this example, D1A1 60 sends an HTTP Request 110 for renewing its subscription to the GW 6. The procedure can then repeat itself as previously described above with the GW 6 implementing the algorithm described above which includes checking if a subscription for the same resource exists in box 112 and updating the binding table (traffic table) to close old sessions and update outgoing sessions for the same subscription and update the traffic table with a new session for impacted subscriptions in box 114. For this example, the outcome of the algorithm also results in the GW 6 sending an HTTP request 116 to the M2M Service Capabilities Platform 10 to subscribe to changes to both resources R1 and R2.

According to exemplary embodiments, subscription management can also be performed at the M2M device 4 level. Upon receipt of a request from an application resident on the device, there can be different processing scenarios for the M2M device 4. For example, if the M2M device 4 does not have an existing HTTP session with the GW 6, then the M2M device 4 creates a new HTTP session with the GW 6 for the new subscription and creates a new entry in its traffic table to include all desired information for that subscription. If the M2M device 4 already has an existing HTTP session with the GW 6 then the M2M device 4 creates a new entry for the new subscription in its traffic table and includes all desired information for that subscription.

In the later case, the M2M device 4 can follow one of two paths. For a first use case, if the M2M device 4 has an already established subscription for the same resource that the application on the M2M device 4 is now interested in, then the M2M device 4 updates its entry for that subscription in its traffic table to include the existing outgoing HTTP session identification. The algorithm can then be terminated. For a second use case, if the application on the M2M device 4 does not have an already established subscription for the same resource that the application on the M2M device 4 is now interested in, then the M2M device 4 establishes a new HTTP session with the M2M GW 6 to convey the new subscription as well as all other subscriptions of the old HTTP session. The M2M device 4 then updates its traffic table to include the appropriate outgoing session information for all impacted subscriptions.

Figure 5:
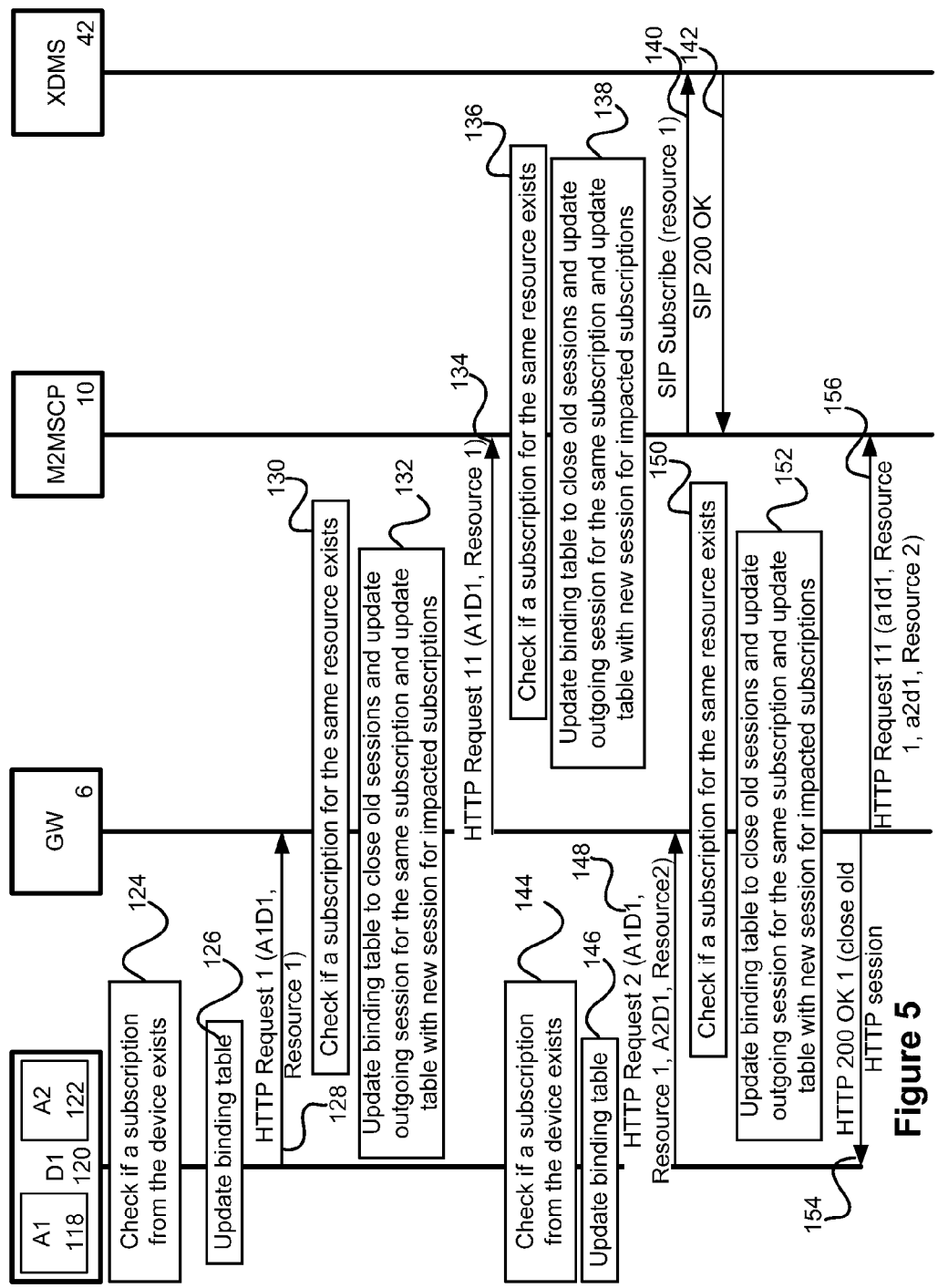
FIGS. 5 and 6 show a signaling diagram for managing multiple subscriptions for any resource from the point of view of an M2M device according to exemplary embodiments.
Figure 6:
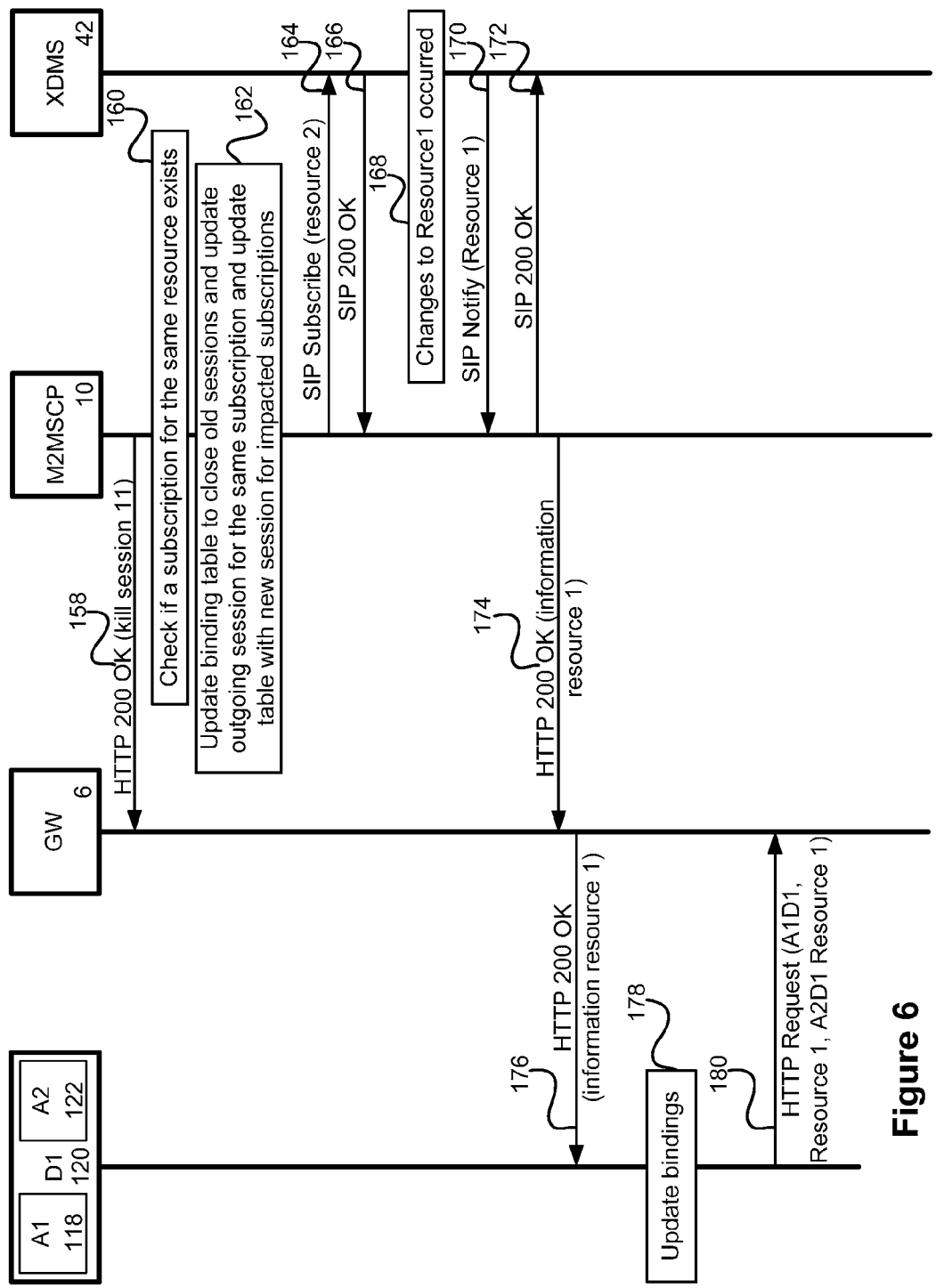

According to exemplary embodiments, FIGS. 5 and 6 show a signaling diagram that illustrates an exemplary technique for M2M device management of subscriptions. Initially, application A1 118 operating on device D1 120 requests the establishment of a subscription for changes to resource R1. D1 120 then executes the device algorithm described above which includes checking if a subscription from the device exists in box 124 and updating the binding (traffic) table in box 126. As an outcome of executing D 120's algorithm, in this example, D1 120 does not have an existing HTTP session with the GW 6, and hence sends an HTTP request 128 to the GW 6 requesting to subscribe to changes to resource R1 on behalf of A1 118. Upon receipt of the HTTP request 128, the GW 6 implements the algorithm described above which includes checking if a subscription for the same resource exists in box 130 and updating the GW 6's binding table (traffic table) to close old sessions to D1 120 (if needed) and update outgoing sessions for the same subscription and update the traffic table with a new session for impacted subscriptions in box 132. For this example, the outcome of the GW 6's algorithm also results in the GW 6 sending an HTTP Request 134 to the M2M Service Capabilities Platform 10 to subscribe to changes to resource R1.

According to exemplary embodiments, upon receipt of the HTTP Request 134 the M2M SCP 10 can perform the M2M SCP algorithm which includes checking if a subscription for the same resource exists in box 136 and updating the binding table (traffic table) to close old sessions and update outgoing sessions for the same subscription and update the traffic table with a new session for impacted subscriptions in box 138. In this example, the algorithm also results in the M2M SCP 10 sending a SIP SUBSCRIBE message 140 to the XDMS 42 to subscribe to changes in the resource R1. After receipt of the SIP SUBSCRIBE message 140, the XDMS 42 responds with a SIP 200 OK message 142. Upon receipt of the SIP 200 OK message 142, the M2M SCP 10 updates its traffic table with the outgoing session information.

Continuing with this example, application A2 122 operating on device D1 120 requests the establishment of a subscription for changes to resource R2. D1 120 then executes the device algorithm described above which includes checking if a subscription from the device exists in box 144 and updating the binding (traffic) table in box 146. As an outcome of executing the device algorithm, in this example, D1 120 sends an HTTP request 148 to the GW 6 requesting to subscribe to changes to resource R1 and R2 on behalf of A1 118 and A2 122, respectively. Upon receipt of the HTTP request 148, the GW 6 implements the GW 6's algorithm described above which includes checking if a subscription for the same resource exists in box 150 and updating the GW 6's binding table (traffic table) to close old sessions and update outgoing sessions for the same subscription and update the traffic table with a new session for impacted subscriptions in box 152. For this example, the outcome of the GW 6's algorithm also results in the GW 6 sending an HTTP Request 156 to the M2M SCP 10 to subscribe to changes to both resources R1 and R2, and in the GW 6 sending an HTTP 200 OK message 154 informing D1 120 that the GW 6 is closing the old HTTP session with D1 120, i.e., the HTTP session 128 which was previously setup for A1 118.

According to exemplary embodiments, the M2M SCP 10 can implement its algorithm, as previously described, which leads to checking if a subscription for the same resource exists in box 160 and updating the binding table (traffic table) to close old sessions and update outgoing sessions for the same subscription and update the traffic table with a new session for impacted subscriptions in box 162. In this example, the M2M SCP 10's algorithm also results in the M2M SCP 10 in terminating the old HTTP session with the GW 6 as shown by HTTP 200 Ok message 158. Additionally, as an outcome of the algorithm, a SIP SUBSCRIBE message 164 is sent to the XDMS 42 to subscribe to changes in the resource R2. After receipt of the SIP SUBSCRIBE message 164, the XDMS 42 responds with a SIP 200 OK message 166 and then the M2M SCP 10 can update its traffic table with the current outgoing session information.

Continuing with this example using the signaling diagrams of FIGS. 5 and 6, a change to resource R1 has occurred in box 168. This triggers the XDMS 42 to send a SIP NOTIFY message 170 to the M2M SCP 10 to report the change and include the changed information. The M2M SCP 10 acknowledges the SIP NOTIFY message 170 with a SIP 200 OK message 172 sent back to the XDMS 42. The M2M SCP 10 can then identify all active subscriptions for M2M applications that are subscribed to the requested resource to report the information to them as shown by the HTTP 200 OK message 174 sent to the GW with the information related to the resource change.

At this point in time, the GW 6 desires to refresh subscriptions. The GW 6 can wait, using a timer or other means, for D1 to confirm renewal of its subscription before it refreshes all subscriptions. The GW 6 subsequently sends an HTTP 200 OK message 176 to D1 which includes the resource change information. D1 can then update the application A1. In this case, D1 sends an HTTP request 180 to the GW 6 to renew its subscription for A1 to resource R1 and updates the device's traffic tables 178 accordingly. This procedure can then repeat itself as desired and when appropriate. According to exemplary embodiments, the same sequence described above can take place between M2M device 5 and the M2M Service Capability platform 10 for handling subscriptions generated in M2M device 5. In this case the GW 6 is not involved. The procedures and algorithms in both M2M device 5 and the M2M Service Capability platform 10 are identical to what has already been described before, i.e., the M2M device 5 level behaves exactly like M2M device 4.

Figure 7:
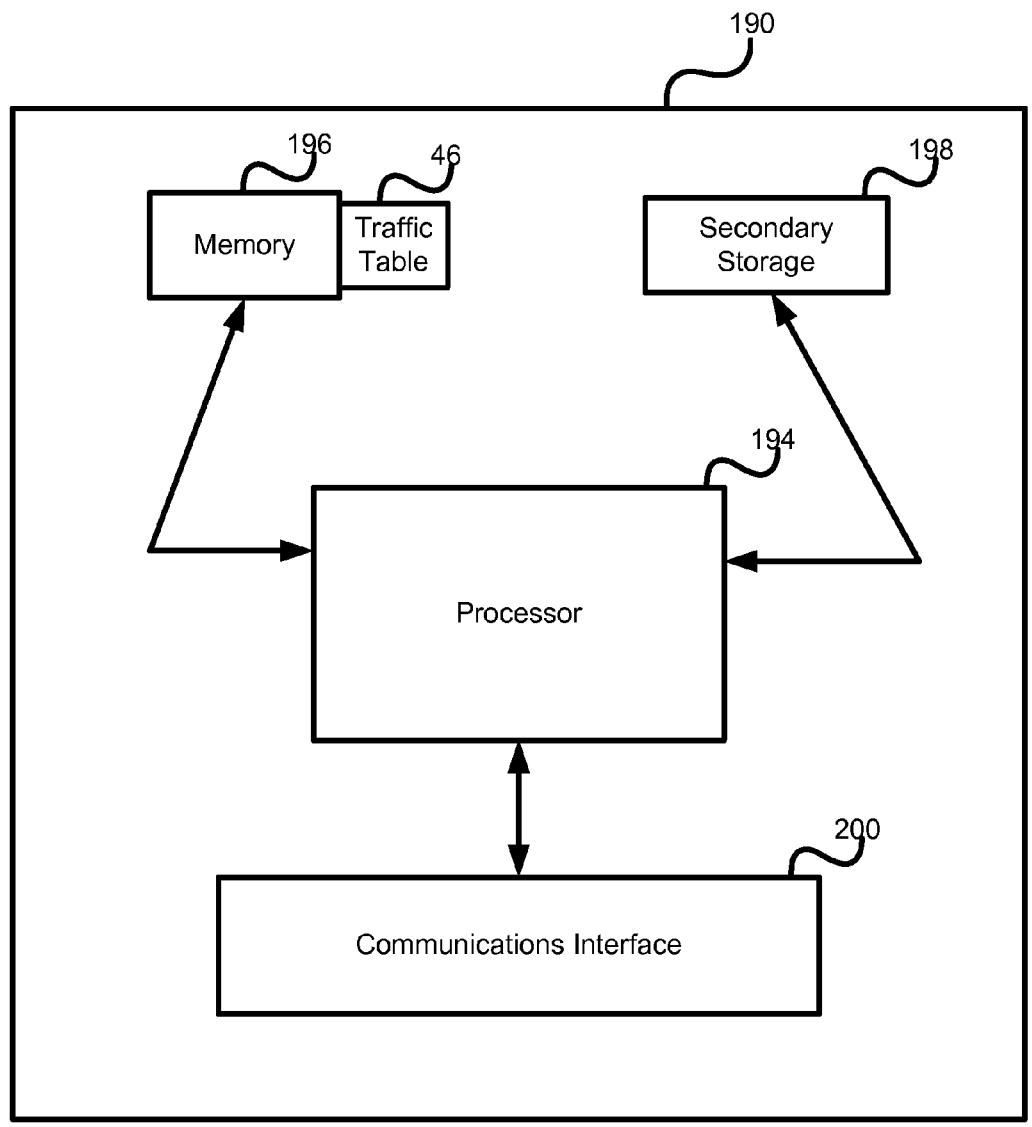
FIGS. 7 and 8 illustrate a communications node according to exemplary embodiments.
Figure 8:
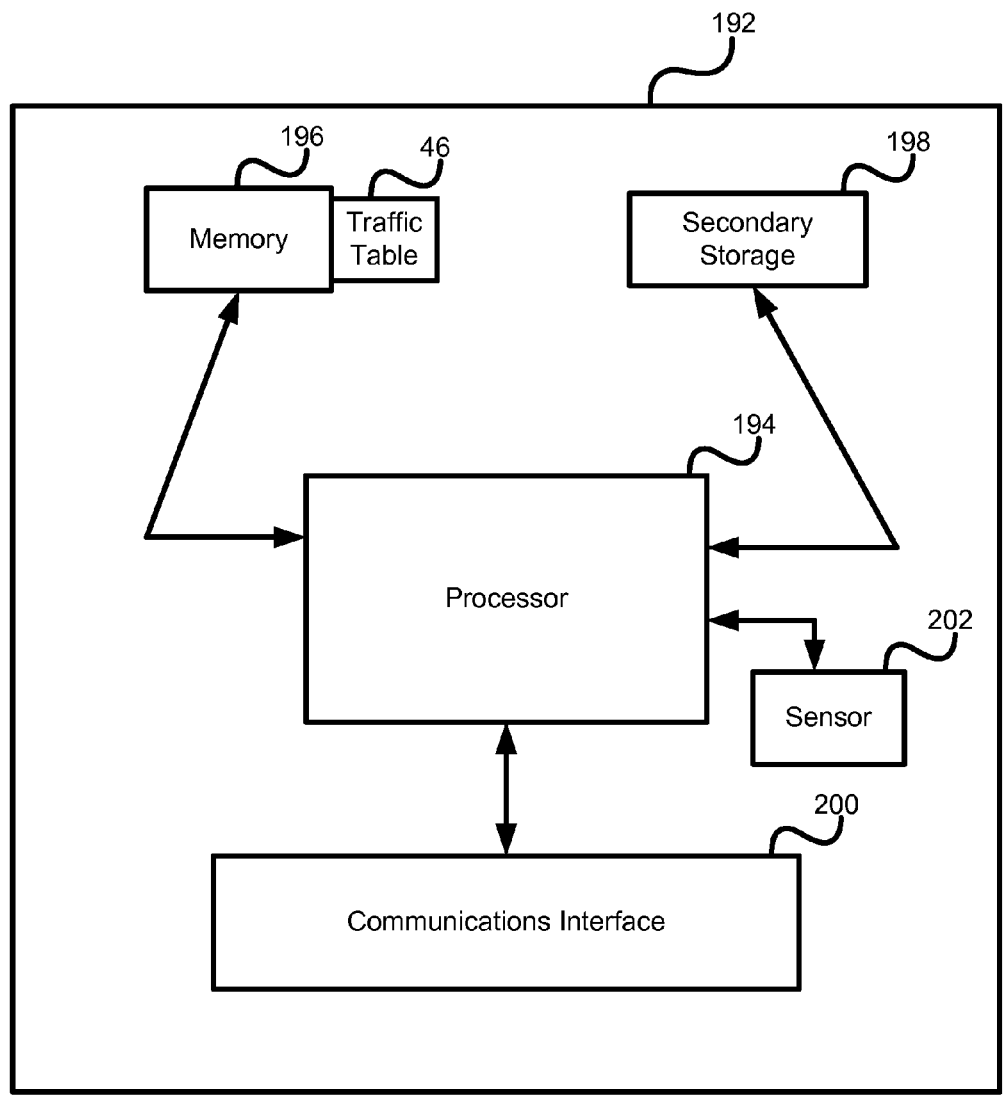

The exemplary embodiments described above provide for managing subscriptions in an M2M communications system 2. Exemplary communications nodes 190 and 192, e.g., an M2M device 4, an M2M device 5, a GW 6 and a M2M SCP 10, which can perform subscription management and execute the desired algorithm will now be described with respect to FIGS. 7 and 8. The communications nodes 190 and 192 can contain a processor 194 (or multiple processor cores), memory 196 which can include a traffic table 46, one or more secondary storage devices 198 and an interface unit 200 to facilitate communications between the communications nodes 190, 192 and other nodes/devices that communicate with the M2M communications system 2. In FIG. 8, the communications node 192 can also include a sensor (or measurement device) 202 for gathering data in an M2M device. The processor 194 can execute algorithms, other instructions and make the associated determinations to facilitate the exemplary embodiments described above with respect to subscription management as described herein. Memory 196 can be used to store information including the algorithms described herein, authorization information, as well as the traffic table 46. Thus, communications nodes 190 and 192 can perform the functions of the GW 6, the M2M SCP 10 and an M2M device 4 or 5 as desired.

In an exemplary method for data in a M2M system the gateway will subscribe to an event on behalf of a plurality of M2M devices using a single Hypertext Transport Protocol (HTTP) session. In an exemplary method for managing subscriptions for an M2M device, a subscription request for a resource is received. Following receipt of the subscription request a determination is made to see if the M2M device has an existing hypertext transfer protocol (HTTP) session with a gateway (GW) or an M2M Service Capability platform 10. An entry is registered in the traffic table of the M2M device to store information associated with the previous determination.

Figure 9:
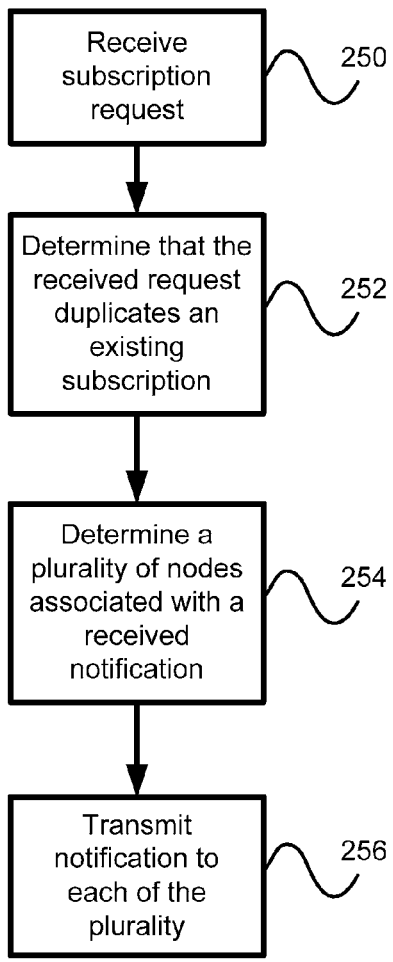
FIG. 9 shows a method flowchart according to exemplary embodiments.

FIG. 9 illustrates an exemplary method of handling subscription requests at a gateway. One skilled in the art will appreciate that the flow chart of FIG. 9 can be viewed as a generalization of many of the processes shown in FIGS. 11-14. In step 250, the gateway receives a subscription request. This request may be received from an M2M device that connects to the network through the gateway or it may be received from an M2M node in the network. The subscription request can be directed at either an M2M device that connects to the network through the gateway or it may be directed to an M2M node in the network. Thus, it could be received from an M2M device subscribing to an event through the M2M SCL Platform, or it could be an M2M server subscribing to events occurring at the M2M device. Upon receipt of the subscription request, a determination is made in step 252 that the request is a duplicate of a previously received request. Because the gateway has already subscribed to the event that is the subject of the request, the gateway can discard the request and simply provide an acknowledgement, such as an HTTP 200 OK message or a SIP 200 OK message. When a notification is received, the gateway will determine a plurality of nodes that are associated with the received notification in step 254. One skilled in the art will appreciate that this determination can be made using a lookup in a resource such as a traffic table that has been updated as a result of step 252. Upon determining the plurality of nodes associated with the received notification, the gateway can issue notification messages to each of the nodes in the plurality in step 256.

Figure 10:
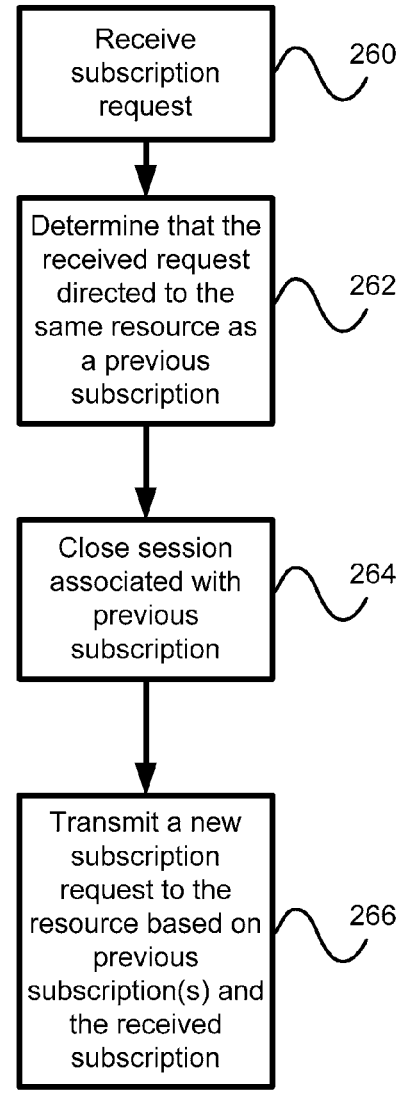
FIG. 10 shows a method flowchart according to exemplary embodiments.

FIG. 10 illustrates an exemplary method of handling subscription requests at a gateway. One skilled in the art will appreciate that the flow chart of FIG. 10 can be viewed as a generalization of many of the processes shown in FIGS. 11-14. In step 260, the gateway receives a subscription request directed to a resource. One skilled in the art will appreciate that just as with FIG. 9, the sender and specified resource can be M2M devices and M2M network nodes. In step 262 the gateway determines that the received request is directed to the same resource as a previous subscription. One skilled in the art will appreciate that two subscriptions can be issued to the same resource but for different events. To reduce the overhead of managing a plurality of such subscriptions, in step 264 the session associated with the previously identified subscription is closed. In step 266 a new session to the resource is created to accommodate a subscription to a plurality of events. Thus, if a gateway has a subscription to a first event with a resource and then receives a subscription to a second event at the same resource, it will tear down the session associated with the subscription to the first event, and create a new session associated with both the first and second events. One skilled in the art will appreciate that it is possible for the gateway to already have a plurality of subscriptions to the same resource when a new subscription is received. The resulting session would be used for a subscription to all of the events including the event specified in the newly received subscription.

From the foregoing, it will be apparent that exemplary embodiments enable systems to, for example, consolidate subscriptions with M2M devices. When an M2M device wants to subscribe, the M2M device issues a subscription request addressed to a server. The request is routed through the GW. The GW intercepts the request and, instead of allowing the M2M device to subscribe itself, the gateway subscribes on behalf of the M2M device. If a second M2M device later wants the same subscription, and thus issues a second subscription request, the GW can drop the second subscription request and add the second M2M device to a list of parties that need to be notified when the event associated with that same subscription occurs. Alternatively, the GW can multiplex the second subscription request with the first subscription request over a single HTTP session with the monitored device. In either case, when the subscribed to event occurs, the GW is notified. The GW then issues corresponding notifications to each subscribing M2M device. Each of these notifications occurs in a separate http session.

Further embodiments will now be discussed with reference to FIGS. 11-14 which illustrate exemplary embodiments of the actions of the gateway to aggregate and simplify the subscription processing process. One skilled in the art will appreciate that the gateway as discussed herein sits in a communication path between M2M devices and the M2M network elements such as the M2M SCL Platform and the M2M Network Server, along with other application servers that may interact.

Figure 11:
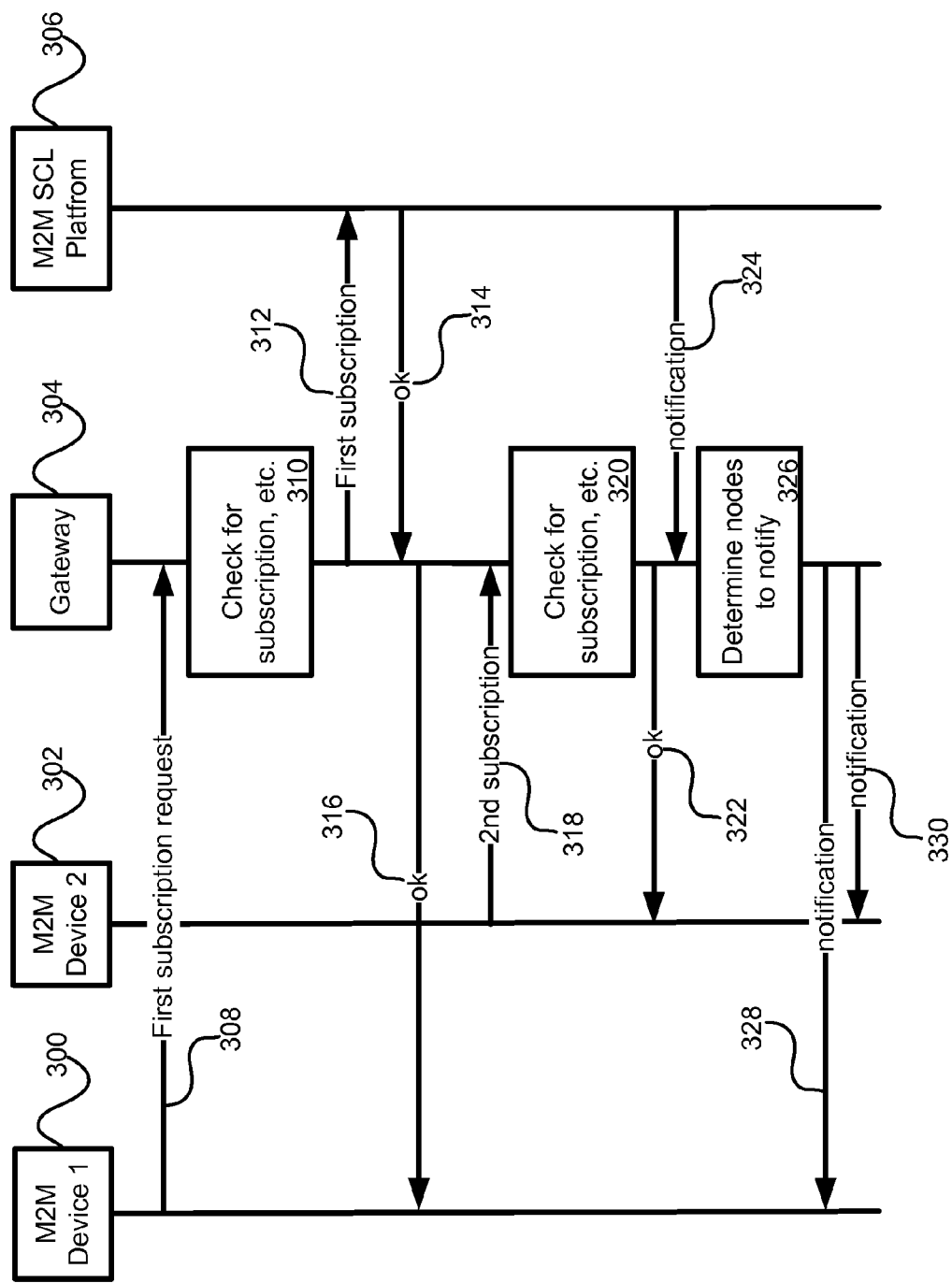
FIG. 11 illustrates a dataflow for two M2M devices subscribing to the same event notifications where both devices are connected through a common gateway.

In FIG. 11, two M2M devices (M2M device 1 300, and M2M device 2 302) connect to gateway 304 which provides network access services to the connected devices. Through gateway 304, the M2M devices 300 and 302 can connect to the M2M SCL platform 306. One skilled in the art will appreciate that other nodes may exist in such a configuration, but for the purposes of the following data flow, only these nodes will be discussed. M2M device 1 300 issues a first subscription request 308 for an event monitored by M2M SCL platform 306. In one such embodiment, subscription request 308 is addressed to M2M SCL platform 306, but is intercepted by gateway 304. Gateway 304 examines the intercepted (or received) subscription request and checks to see if an existing subscription to the same service is present in step 310. Seeing no matching subscription, Gateway 304 issues a subscription 312 to M2M SCL Platform 308. Subscription 312 is based on received subscription 308. Upon receiving an acknowledgement 314 to subscription 312, gateway 304 is able to issue an acknowledgement 316 to M2M device 300. One skilled in the art will appreciate that from the perspective of M2M SCL platform 306, gateway 304 has subscribed and there may be no indication to M2M SCL platform 306 that any subscription request was generated by M2M device 1 300. When M2M device 2 302 issues the second subscription request 318, it is intercepted by gateway 304 which in step 320 checks the received subscription request 318 and determines that it is a duplicate subscription. In response to the determination of step 320, gateway 304 provides an acknowledgement message 322 to M2M device 2 302. At some future point, M2M SCL Platform 306 issues an event notification message 324 to gateway 304 in response to the subscription 312. Gateway 304 checks its internal subscription tables and determines that the received notification is to be forwarded to M2M Device 1 300 in response to the first subscription 308 and to M2M device2 302 in response to the second subscription 318 in step 326. Thus, notification message 328 is forwarded to M2M Device 1 300 and notification message 330 is forwarded to M2M Device 2 302.

Figure 12:
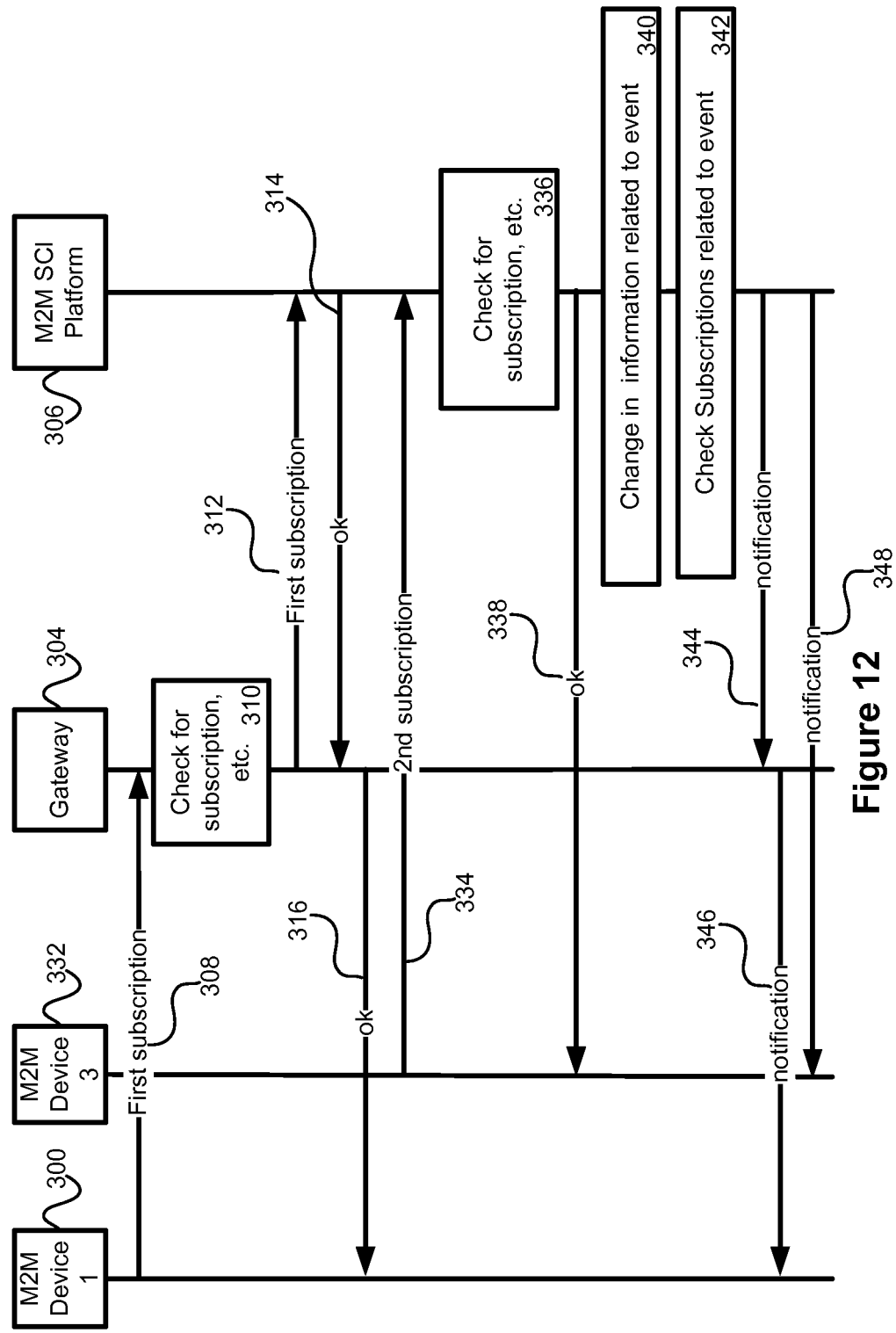
FIG. 12 illustrates a dataflow for two M2M devices subscribing to the same event notifications, where one of the devices is not connected through a gateway.

FIG. 12 illustrates a data flow in a network similar to that used in FIG. 11, with the exception that in place of M2M Device 2, there is M2M Device 3 332 which is able to connect directly to the network without use of Gateway 304. As before, M2M device 1 300 issues a first subscription request 308 for an event monitored by M2M SCL platform 306. In one such embodiment, subscription request 308 is addressed to M2M SCL platform 306, but is intercepted by gateway 304. Gateway 304 examines the intercepted (or received) subscription request and checks to see if an existing subscription to the same service is present in step 310. Seeing no matching subscription, Gateway 304 issues a subscription 312 to M2M SCL Platform 306. Subscription 312 is based on received subscription 308. Upon receiving an acknowledgement 314 to subscription 312, gateway 304 is able to issue an acknowledgement 316 to M2M device 300. One skilled in the art will appreciate that from the perspective of M2M SCL platform 306, gateway 304 has subscribed and there may be no indication to M2M SCL platform 306 that any subscription request was generated by M2M device 1 300. At this time, M2M device 3 332 issues the second subscription message 334 to the M2M SCL platform 306. This message goes directly to M2M SCL Platform 306 because M2M device 3 332 does not rely upon gateway 304 for its network connection. In step 336, M2M SCL Platform 306 examines the received subscription 334 and determines that this subscription is valid and unique. As such, it registers the subscription and issues an acknowledgement message 338 to M2M device 3 332. In step 340, M2M SCL Platform 306 determines that there is a change in the information associated with an event for which there is at least one subscription. In step 342, the subscriptions associated with the event of step 340 are determined (subscription 312 and subscription 334), and notification messages are sent. Notification message 344 is sent, in reply to subscription 312, to gateway 304. In response to receipt of notification message 344, gateway 304 determines that this is in response to subscription 312, and then associates the message to subscription 308 and transmits notification 346 to M2M Device 1 300. Notification 348 is directly sent to M2M Device 3 332 in reply to subscription 334.

Figure 13:
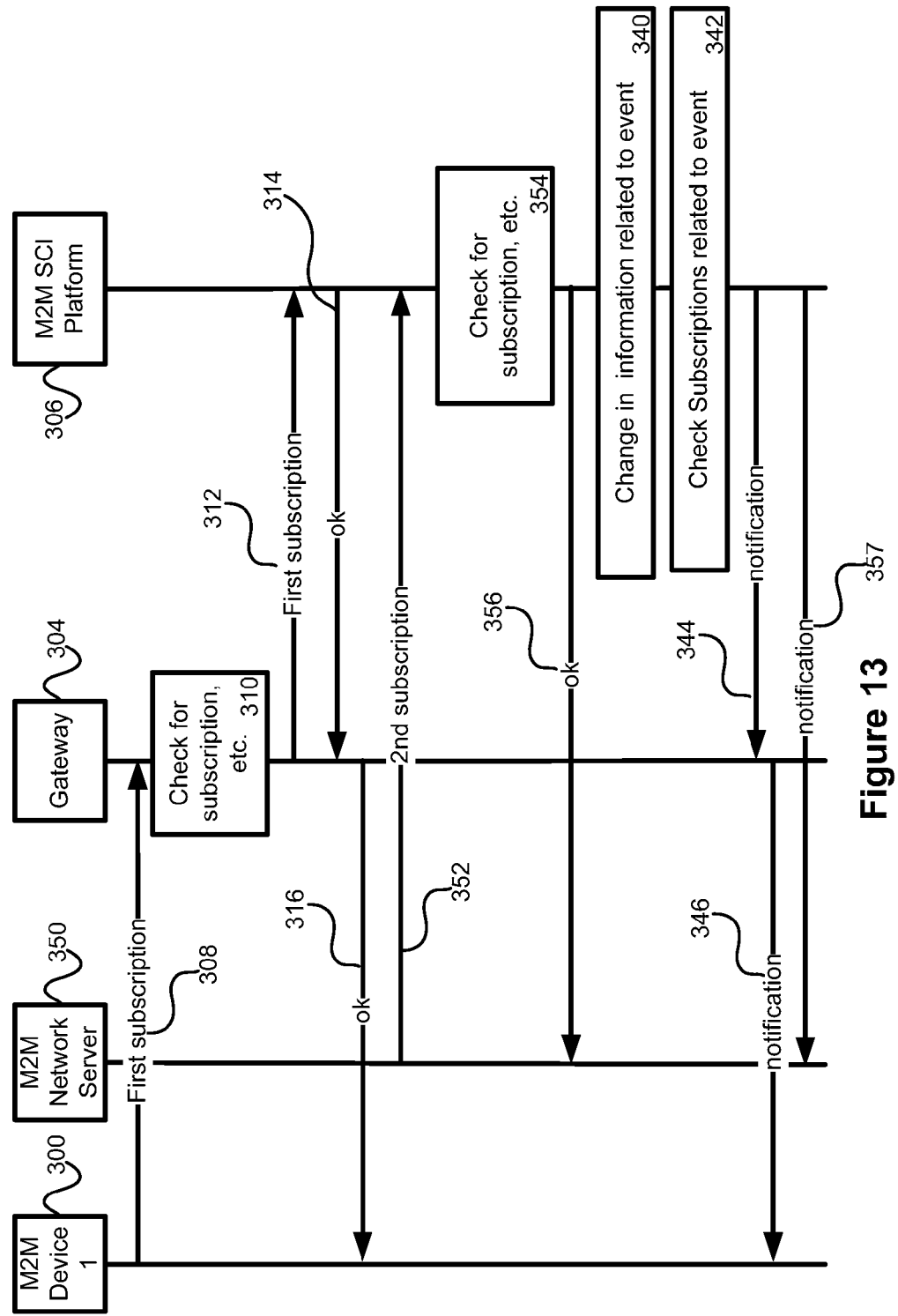
FIG. 13 illustrates a dataflow for an M2M device and an M2M server subscribing to the same event notification.

FIG. 13 illustrates a data flow in a network similar to that used in FIG. 12, with the exception that in place of M2M Device 3, there is M2M network Server 350 which is directly connected to the network without use of Gateway 304. As before, M2M device 1 300 issues a first subscription request 308 for an event monitored by M2M SCL platform 306. In one such embodiment, subscription request 308 is addressed to M2M SCL platform 306, but is intercepted by gateway 304. Gateway 304 examines the intercepted (or received) subscription request and checks to see if an existing subscription to the same service is present in step 310. Seeing no matching subscription, Gateway 304 issues a subscription 312 to M2M SCL Platform 306. Subscription 312 is based on received subscription 308. Upon receiving an acknowledgement 314 to subscription 312, gateway 304 is able to issue an acknowledgement 316 to M2M device 300. One skilled in the art will appreciate that from the perspective of M2M SCL platform 306, gateway 304 has subscribed and there may be no indication to M2M SCL platform 306 that any subscription request was generated by M2M device 1 300. At this time, M2M network Server 350 issues the second subscription message 352 to the M2M SCL platform 306. In step 354, M2M SCL Platform 306 examines the received subscription 352 and determines that this subscription is valid and unique. As such, it registers the subscription and issues an acknowledgement message 356 to M2M network Server 350. In step 340, M2M SCL Platform 306 determines that there is a change in the information associated with an event for which there is at least one subscription. In step 342, the subscriptions associated with the event of step 340 are determined (subscription 312 and subscription 352), and notification messages are sent. Notification message 344 is sent, in reply to subscription 312, to gateway 304. In response to receipt of notification message 344, gateway 304 determines that this is in response to subscription 312, and then associates the message to subscription 308 and transmits notification 346 to M2M Device 1 300. Notification 357 is directly sent to M2M network Server 350 in reply to subscription 352.

Figure 14:
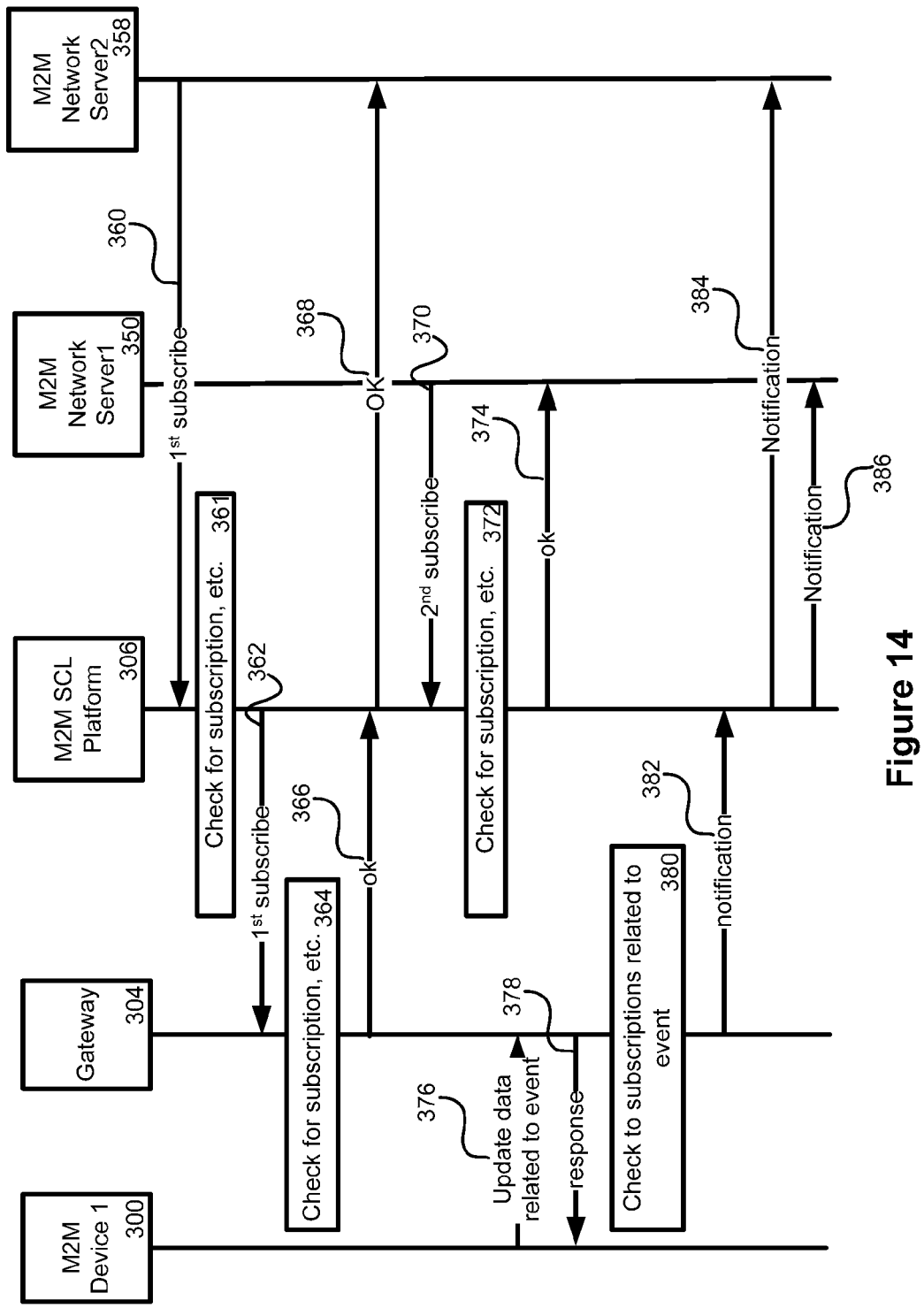
FIG. 14 illustrates a dataflow for two M2M servers subscribing to the same event notification associated with an M2M device connected through a gateway.

FIG. 14 illustrates a data flow in a network where M2M Device 1 300 is connected to an M2M network through gateway 304. In the M2M Network, there are a plurality of nodes including M2M SCL Platform 306, M2M Network Server 1 350, and M2M Network Server 2 358. In the following scenario, M2M network server 1 350 and M2M Network Server 2 358 are subscribing to events occurring on M2M Device 1

300. As M2M Device 1 300 is connected through gateway 304, Gateway 304 can serve to aggregate requests from a plurality of different M2M SCL Platforms. In the example shown in FIG. 14, the M2M Network servers 350 and 358 both connect to M2M SCL Platform 306, but one skilled in the art will appreciate that there can be a plurality of different M2M SCL Platforms serving a plurality of different M2M Network servers. In such a scenario, the Gateway 304 would function as described below, but would also serve to aggregate the incoming requests from the plurality of M2M SCL Platforms as it does with requests from M2M devices.

As illustrated in FIG. 14, M2M Network Server 2 358 issues a first subscription request 360 to M2M SCL Platform 306. M2M SCL Platform 306 performs a check for existing subscriptions from other nodes matching subscription request 360. Upon determining that there is no such subscription already in place, in step 361, M2M SCL Platform 306 issues subscription message 362 to gateway 304. Gateway 304, in step 364, checks to see if there is another subscription request for the same matter. In this case, gateway 304 determines that it will already receive notification of an event associated with the received subscription 364. As such, gateway 304 updates its notification table, and issues an acknowledgement message 366 to M2M SCL Platform 306 in response to request 362. Platform 306 then issues acknowledgement message 368 to M2M Network Server 2 358 in response to request 360. At this time, M2M Network Server 1 issues a subscription request 370 to M2M SCL Platform 306. In step 372, M2M SCL Platform 306 checks to see if the subscription matches existing subscriptions, and upon determining that the desired notification matches the one requested in subscription request 360, M2M SCL Platform 306 issues an acknowledgement 374 to request 370 and updates its notification table. At a future time, update data associated to the subscribed event is forwarded from M2M device 1 300 to gateway 304 in message 376. Gateway 304 acknowledges receipt of the update data with message 378, and checks its subscription tables in step 380 to determine that M2M SCL Platform 306 is to be notified. Gateway 304 issue notification message 382 to M2M SCL Platform 306. M2M SCL Platform 306, upon receipt of notification message 382, M2M SCL Platform 306 determines that both M2M Network Server 1 350 and M2M Network Server 2 358 should be notified, and accordingly issues notification 384 to M2M Network Server 2 358 in response to subscription request 360, and notification 386 to M2M Network Server 1 350 in response to subscription 370.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for handling subscriptions in a machine-to-machine system, the method comprising:
    receiving at a gateway a subscription request associated with both a machine to machine device and a machine to machine network server;
    determining that the received subscription request is directed to a second event associated with a resource with which a plurality of previous subscriptions have been registered for first events, the first and second events being different from each other;
    closing a session associated with the previous subscriptions with the resource;
    transmitting to the resource a new subscription determined in accordance with the previous subscriptions and the received subscription request, the new subscription associated with the first and second events; and
    updating a traffic table based on the closing of the session associated with the previous subscriptions and on the transmitting of the new subscription to the resource.

2. The method of claim 1 wherein the subscription request received at the gateway is transmitted by the machine to machine network server and specifies the machine to machine device as a destination.

3. The method of claim 1 further including the step of responding to the originator of the request subsequent to the step of determining.

4. The method of claim 1 further including the step of updating the traffic table to reflect the received subscription.

5. The method of claim 1 wherein the subscription request received at the gateway is transmitted by the machine to machine device and specifies the machine to machine network server as a destination.

6. The method of claim 1 wherein the session is a hypertext transfer protocol (http) session.

7. The method of claim 6 wherein the step of transmitting includes creating a new http session.

8. A gateway (GW) for communicating data in a Machine-to-Machine (M2M) network comprising:
a communications interface for receiving from M2M devices both subscription requests and notifications, and for transmitting to M2M devices both subscription requests and notifications;
a memory for storing a traffic table; and
a processor for determining if a subscription request received over the communications interface is directed to a second event associated with a resource with which a plurality of previous subscriptions have been registered for first events, the first and second events being different from each other, for closing a session associated with the previous subscriptions with the resource responsive to the determination, for causing the communications interface to transmit a new subscription determined in accordance with the previous subscriptions and the received subscription request, the new subscription being associated with the first and second events, and for updating the traffic table based on the closing of the session associated with the previous subscriptions and on the transmitting of the new subscription to the resource.

9. The gateway of claim 8 wherein the processor is adapted to generate a subscription request for transmission over the communications interface in response to receipt of a subscription request over the communications interface, the generated subscription request identifying only the gateway as the subscribing node.

* * * * *

UNITED STATES PATENT AND TRADEMARK OFFICE
CERTIFICATE OF CORRECTION

PATENT NO. : 8,943,132 B2  Page 1 of 1
APPLICATION NO. : 13/230748
DATED : January 27, 2015
INVENTOR(S) : Foti It is certified that error appears in the above-identified patent and that said Letters Patent is hereby corrected as shown below:

In the drawings

In Fig. 1, Sheet 1 of 13, in Box "26", in Line 1, delete "NGC" and insert -- NTM --, therefor.

In Fig. 5, Sheet 5 of 13, for Tag "154", in Line 2, delete "session" and insert -- session) --, therefor.

In the specification

In Column 15, Line 27, delete "Platform 308." and insert -- Platform 306. --, therefor.

Signed and Sealed this
Twenty-eighth Day of June, 2016

Michelle K. Lee
*Director of the United States Patent and Trademark Office*